United States Patent
Martinez et al.

(10) Patent No.: US 7,769,774 B2
(45) Date of Patent: *Aug. 3, 2010

(54) SYSTEM AND METHOD FOR FOCUSED ROUTING OF CONTENT TO DYNAMICALLY DETERMINED GROUPS OF REVIEWERS

(75) Inventors: Anthony Edward Martinez, St. Augustine, FL (US); Bradley Scott Tagg, Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/839,596

(22) Filed: Aug. 16, 2007

(65) Prior Publication Data

US 2008/0040355 A1 Feb. 14, 2008

Related U.S. Application Data

(63) Continuation of application No. 10/933,632, filed on Sep. 2, 2004, now Pat. No. 7,444,323.

(51) Int. Cl.
*G06F 7/00* (2006.01)
(52) U.S. Cl. .......................... 707/769; 705/1
(58) Field of Classification Search .................. None
See application file for complete search history.

(56) References Cited

U.S. PATENT DOCUMENTS

| | | | | |
|---|---|---|---|---|
| 5,247,661 A | * | 9/1993 | Hager et al. | 707/104.1 |
| 5,276,869 A | * | 1/1994 | Forrest et al. | 709/206 |
| 5,317,683 A | * | 5/1994 | Hager et al. | 715/751 |
| 5,377,355 A | * | 12/1994 | Hager et al. | 715/223 |
| 5,862,223 A | | 1/1999 | Walker et al. | |
| 5,948,054 A | | 9/1999 | Nielsen | |
| 7,191,177 B2 | | 3/2007 | Konaka | |
| 2001/0051890 A1 | | 12/2001 | Burgess | |
| 2002/0013836 A1 | | 1/2002 | Friedman et al. | |

(Continued)

FOREIGN PATENT DOCUMENTS

JP 2001339518 A 12/2001

(Continued)

OTHER PUBLICATIONS

Losleben et al., "Help-Exchange: an arbitrated system for a help network", Journal of Network and computer Applications 20, pp. 123-134, 1997.

*Primary Examiner*—Charles Rones
*Assistant Examiner*—Dinku W Gebresenbet
(74) *Attorney, Agent, or Firm*—Yee & Associates, P.C.

(57) ABSTRACT

A mechanism for routing content to a person or group of persons for review and evaluation. This mechanism involves receiving the content and analyzing the content to generate identifiers of subject matter of the content. Subject matter categories are then determined to be associated with the content based on the analysis. The mechanism then retrieves profiles for people that are authorized to review and evaluate content. These profiles include identifiers of categories of knowledge that indicate areas of knowledge held by an associated person. A person is then selected based on the subject matter categories and categories of knowledge. The content may then be routed to a client computing device associated with the selected person or group or persons.

41 Claims, 7 Drawing Sheets

U.S. PATENT DOCUMENTS

| | | | |
|---|---|---|---|
| 2002/0042794 A1* | 4/2002 | Konaka | 707/6 |
| 2002/0087520 A1 | 7/2002 | Meyers | |
| 2003/0028525 A1 | 2/2003 | Santos et al. | |
| 2003/0101083 A1 | 5/2003 | Venkatesh et al. | |
| 2003/0140037 A1* | 7/2003 | Deh-Lee | 707/3 |
| 2003/0144895 A1 | 7/2003 | Aksu et al. | |
| 2003/0158747 A1 | 8/2003 | Beton et al. | |
| 2004/0236714 A1* | 11/2004 | Eisenberger et al. | 707/1 |
| 2005/0228684 A1* | 10/2005 | Pogodin et al. | 705/1 |

FOREIGN PATENT DOCUMENTS

| | | |
|---|---|---|
| JP | 20002245185 A | 8/2002 |

* cited by examiner

► Tech Tag 400 User Interface

► Tech Tag 500 I/O Technologies

▼ Tech Tag 600 Software/Applications

► 600 Software Related Services - General

▼ 620 Image Processing

622 Image scaling
        625 Image rendering
        627 Image scanning
        628 Image recognition ► 640 Natural Language Processing ► 650 Data Compression ► 660 Security/Access Control Software Systems ► 670 Compilers ► 680 Object-Oriented Environment Technology ► 690 Methods of Doing Business ► Tech Tag 700 Network Solutions ▼ Tech Tag 800 Electronic Business Systems ▼ Electronic Business Models 810 Organizational Models
        820 Integration of Information Technology (IT)
        830 Fundamental business process
        850 Economic Models
        850A Justification models
        850B Pricing models ▼ Consulting Methodologies

| 710 | 720 |
|---|---|
| | Expertise Coverage |
| ⋮ | ⋮ |
| ► Tech Tag 400 User Interface | High |
| ► Tech Tag 500 I/O Technologies | Medium |
| ▼ Tech Tag 600 Software/Applications | Medium |
|     ► 600 Software Related Services - General | Medium |
|     ▼ 620 Image Processing | Medium |
|         622 Image scaling | Medium |
|         625 Image rendering | Medium |
|         627 Image scanning | High |
|         628 Image recognition | Low |
|     ► 640 Natural Language Processing | Medium |
|     ► 650 Data Compression | Medium |
|     ► 660 Security/Access Control Software Systems | Medium |
|     ► 670 Compilers | High |
|     ► 680 Object-Oriented Environment Technology | High |
|     ► 690 Methods of Doing Business | Medium |
| ► Tech Tag 700 Networking Solutions | Medium |
| ▼ Tech Tag 800 Electronic Business Systems | Medium |
|     ▼ Electronic Business Models | Medium |
| | Medium |
|         810 Organizational Models | Medium |
|         820 Integration of Information Technology (IT) | Low |
|         830 Fundamental business process | Low |
|         850 Economic Models | Low |
|         850A Justification models | None |
|         850B Pricing models | None |
|     ▼ Consulting Methodologies | Medium |
| ⋮ | ⋮ |

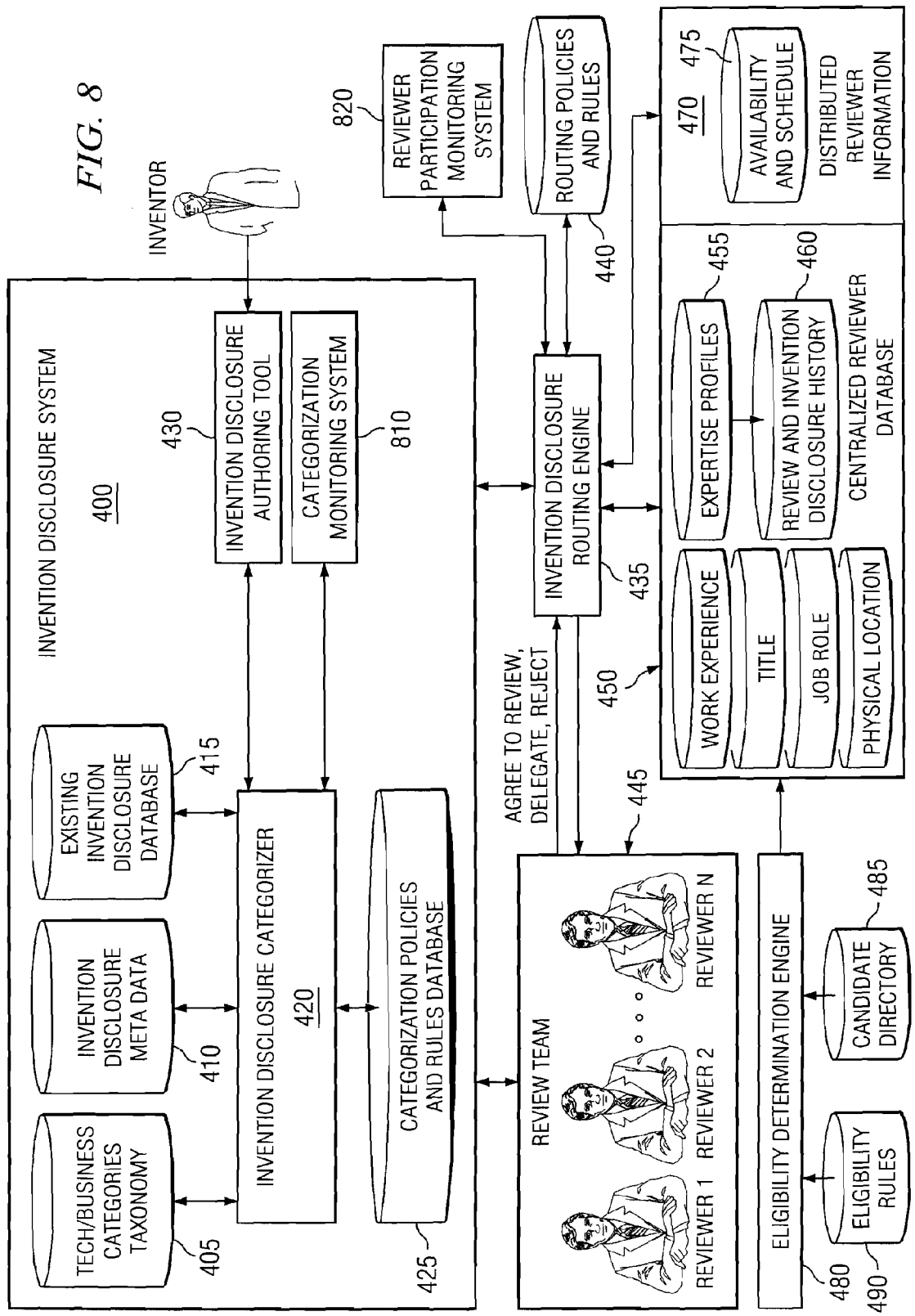

SYSTEM AND METHOD FOR FOCUSED ROUTING OF CONTENT TO DYNAMICALLY DETERMINED GROUPS OF REVIEWERS

This application is a continuation of application Ser. No. 10/933,632, filed Sep. 2, 2004, now U.S. Pat. No. 7,444,323.

BACKGROUND OF THE INVENTION

1. Technical Field

The present invention is generally directed to an improved data processing system. More specifically, the present invention is directed to an improved data processing system and method for routing content to dynamically determined groups of reviewers. In a preferred embodiment, the present invention is directed to a system and method for matching and subsequent routing of content and/or electronic forms requiring review and approval to dynamically formed groups of people with a set of attributes (skills, location, organization affiliation, expertise) that relates to the content/electronic forms.

2. Description of Related Art

Enterprises that engage in intellectual property activities often employ invention disclosure review teams as a filtering step in the process of ensuring the validity of the invention before money and time are spent to search, prepare and file a patent application with the United States Patent and Trademark Office. These review teams are typically composed of inventors from different technology and business areas. For example, a review team may be comprised of individuals whose backgrounds are in the systems architecture, microchip engineering, user interface design, etc. technology areas. While some review teams are focused on a particular technological area, others have broader expertise in an attempt to cover inventions from unexpected quarters.

Review teams are currently formed around physical and/or organizational constructs, such as a research laboratory and/or line of business, e.g., software, services, etc. These same constructs come into play when a new invention disclosure is routed for evaluation. That is, invention disclosures are often routed to review teams based on physical and/or organizational constructs rather than the expertise of the particular review team.

Routing approaches that rely on physical location or organizational affiliations have drawbacks. Many inventors develop ideas that can come from any technological and business area that are not necessarily aligned to the mission of the inventor's organization. For example, an International Business Machines (IBM) Global Services employee may submit a disclosure related to an advance in microchip technology. If the routing is performed based on organizational constructs, that invention disclosure would end up in an IBM Global Services review team which may lack the necessary expertise for a thorough evaluation. Expertise mismatches may result in the positive evaluation of an invalid invention disclosure due to lack of knowledge about the state of the art and/or the invention's true business value, the negative evaluation of a valid disclosure due to lack of understanding and/or appreciation of the novelty, or the missed opportunity of further exploitation of an invention (beyond a patent application filing) due to its lack of visibility.

An additional problem occurs when similar invention disclosures are submitted by different inventors and are routed to different review teams because of the use of physical location or organizational affiliations. Such instances tend to occur when a new technology/paradigm is introduced, e.g., instant messaging, grid computing, etc. Because inventions that are "in progress" internally do not come up in prior art searches, this sometimes results in duplicates of the same idea being processed simultaneously in the same company at non-trivial cost. In large global enterprises, with broad scope of businesses and technologies, this condition may not be uncommon.

All of these problems translate into a needless expense for the company. Therefore, it would be beneficial to have a system and method for routing invention disclosures to review teams based on the expertise of the review team members.

SUMMARY OF THE INVENTION

The present invention provides a system and method for routing content, e.g., invention disclosures, to dynamically identified reviewers/review teams based on an expertise matching mechanism that favors reviewers/review teams that are experienced in the general knowledge area, e.g., technology or business knowledge area, covered by the content, e.g., invention disclosure. The preferred embodiments of the present invention are directed to use of the present invention with the submission and review of invention disclosures, although the present invention is not limited to such content. With a preferred embodiment of the present invention, an invention disclosure is categorized using an established categorization taxonomy when it is created. In addition, each review team and/or reviewer registers himself/herself with the system as having expertise in certain categories of technology/business from the categorization taxonomy. This expertise categorization of the review teams and/or reviewers may be updated as the review team or reviewers expertise changes over time.

The categorization of the invention disclosure may be performed manually by the creator of the invention disclosure or may be performed using an autocategorizing mechanism. The autocategorizing mechanism may make use of, for example, keyword searches or other word and/or pattern matching mechanisms against existing invention disclosures. Based on the categorization of existing invention disclosures and the degree of matching of the current invention disclosure to the existing invention disclosures, an automated categorization may be performed such that the current invention disclosure is categorized into similar technology/business areas as those existing invention disclosures it most closely matches. Alternatively, the categories identified through this automated categorization may be presented to the creator of the invention disclosure, or other user, such that they may choose the categories to be applied to the invention disclosure.

Having categorized the invention disclosure, these categories are used to identify reviewers/review teams that have the necessary knowledge to provide a fair and accurate evaluation of the invention disclosure. Reviewer profiles are retrieved that indicate the areas of expertise of the various reviewers. For example, similar categories to those used to categorize the invention disclosure may be used to indicate the technology/business areas of expertise of the reviewers. This similarity in categories makes it possible to match reviewers having the same categories of expertise with invention disclosures that are categorized into the categories of expertise of the reviewer. In this way, reviewers may be matched up with invention disclosures.

The categories of an invention disclosure, whether determined manually or automatically, may be ranked according to the most relevant category and less relevant categories. In this way, a more accurate routing of the invention disclosure to a dynamically assembled review team having appropriate expertise may be obtained.

In the event that more than one review team and/or reviewer has the expertise necessary to perform a fair evaluation of the invention disclosure, the mechanism of the present invention favors the review team and/or reviewer based on a relevance of the review team or reviewer to the inventors identified in the invention disclosure in terms of organization and/or physical location. Moreover, the initial matching of the invention disclosure to a reviewer/review team may always take into consideration one or more of knowledge or skills matching, physical proximity, organization affiliation, expertise domain, personal experience, and the like, of the reviewers/review teams when selecting a reviewer/review team to which the invention disclosure is to be routed. The parameters of the reviewer/review team that are utilized to perform matching of reviewers/review teams to invention disclosures and selection of a reviewer/review team from those that match the invention disclosure may be set forth in routing policies and rules established within the system of the present invention.

Regardless of the particular routing of the invention disclosure to a review team/reviewer using the present invention, the inventors' organization is provided with credit for submission of the invention disclosure and the reviewing team/reviewer is provided with credit for performing the evaluation of the invention disclosure with regard to internal company accounting and incentive programs.

Thus, the present invention provides a method, system and computer program product for routing content, such as an electronic document, an invention disclosure, an electronic form, or the like, to a person, e.g., a reviewer, for review and evaluation of the content. This method, system and computer program product involves receiving the content and analyzing the content to generate identifiers of subject matter of the content. One or more subject matter categories are then determined to be associated with the content based on the analysis and generation of identifiers.

The method, system and computer program product then retrieves profiles for one or more people that are authorized to review and evaluate content. These profiles include identifiers of categories of knowledge of the one or more people such that the categories of knowledge indicate areas of knowledge held by the associated person, e.g., areas of expertise of the individual person. The present invention then selects a person, from the one or more people, to review and evaluate the content based on the one or more subject matter categories and categories of knowledge of the one or more people. The content may then be routed to a client computing device associated with the selected person, e.g., a notification may be sent with a link to the content.

The present invention permits the formation and co-existence of two distinct types of review teams or groups of reviewers: (1) those that are broad in scope, where team members come from different disciplines; and (2) those that are focused in a specific knowledge area, e.g., business/technology knowledge area. The present invention increases the visibility of ideas within the content beyond the content creator's immediate physical location and/or organizational area as the content is exposed to expert individuals who know how best to leverage the ideas within the content in other areas, e.g., business or technology areas.

With regard to invention disclosures, the present invention reduces the incidence of independently submitted invention disclosures that are alike but not yet in a searchable state as these would typically be routed to the same review team which is in a better position to recognize similarities. The present invention improves the overall quality of invention disclosure submissions through informed, insightful evaluations from review teams that have expertise in the particular technology areas. In addition, the present invention may be used to view the expertise of review teams/reviews with regard to the taxonomy of invention categories so that it can be determined where coverage gaps or excesses are present. This may trigger the formation of a new review team or re-balancing of existing review teams.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram of a technological/business category taxonomy that may be used to categorize invention disclosures and reviewer expertise in accordance with one exemplary embodiment of the present invention;

FIG. 7 is an exemplary diagram of a display for determining technology area expertise coverage by reviewers in accordance with on exemplary embodiment of the present invention;

FIG. 8 is an exemplary diagram of the primary operational elements of an invention disclosure and routing mechanism in accordance with an alternative embodiment of the present invention in which measurement mechanisms are provided for measuring the effectiveness of the invention disclosure categorization mechanism and the invention disclosure routing mechanism;

DETAILED DESCRIPTION OF THE PREFERRED EMBODIMENT

Figure 1:
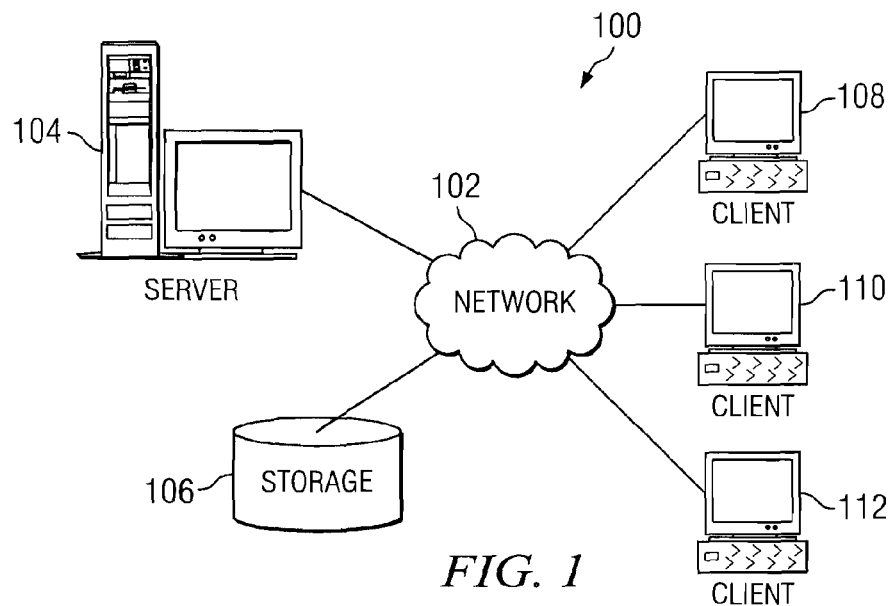
FIG. 1 is an exemplary diagram of a distributed data processing environment in which aspects of the present invention may be implemented.
Figure 2:
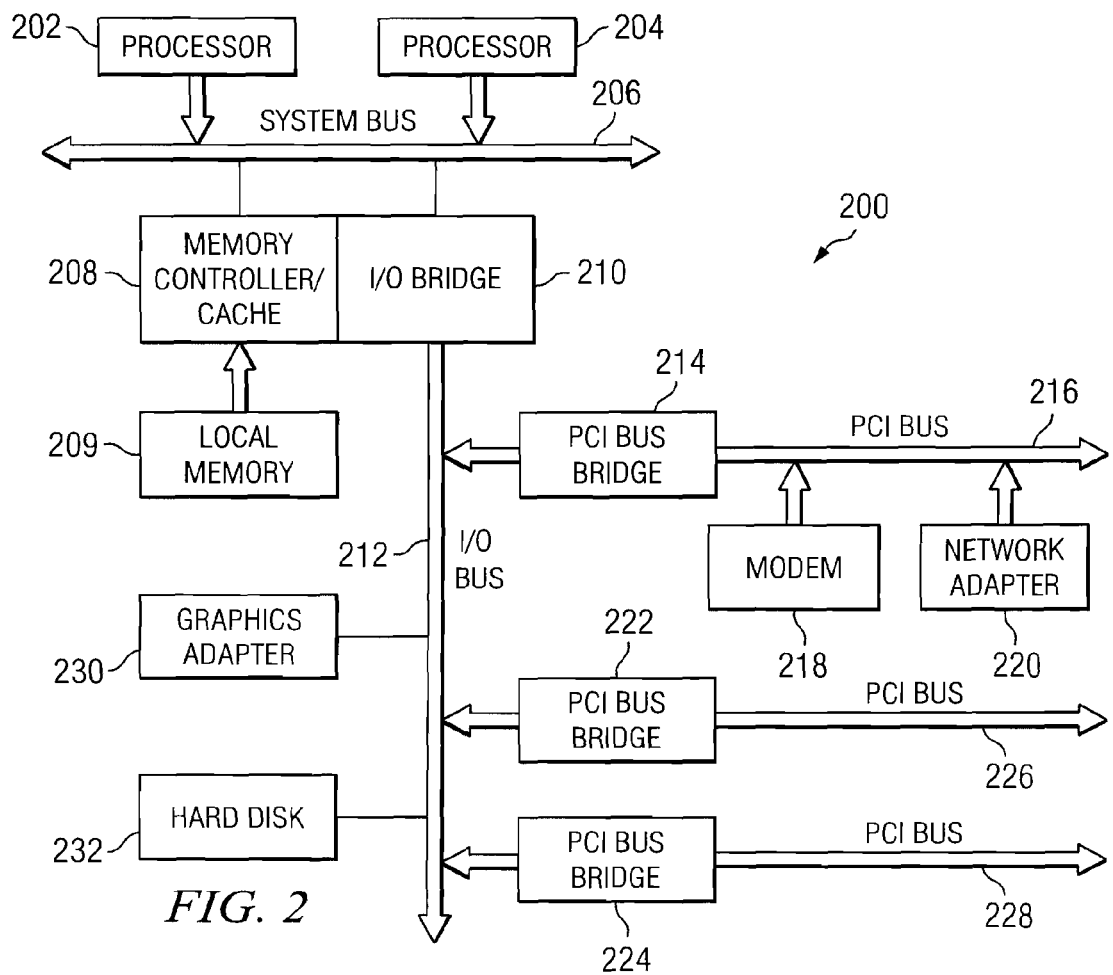
FIG. 2 is an exemplary block diagram of a server computing device in which aspects of the present invention may be implemented.
Figure 3:
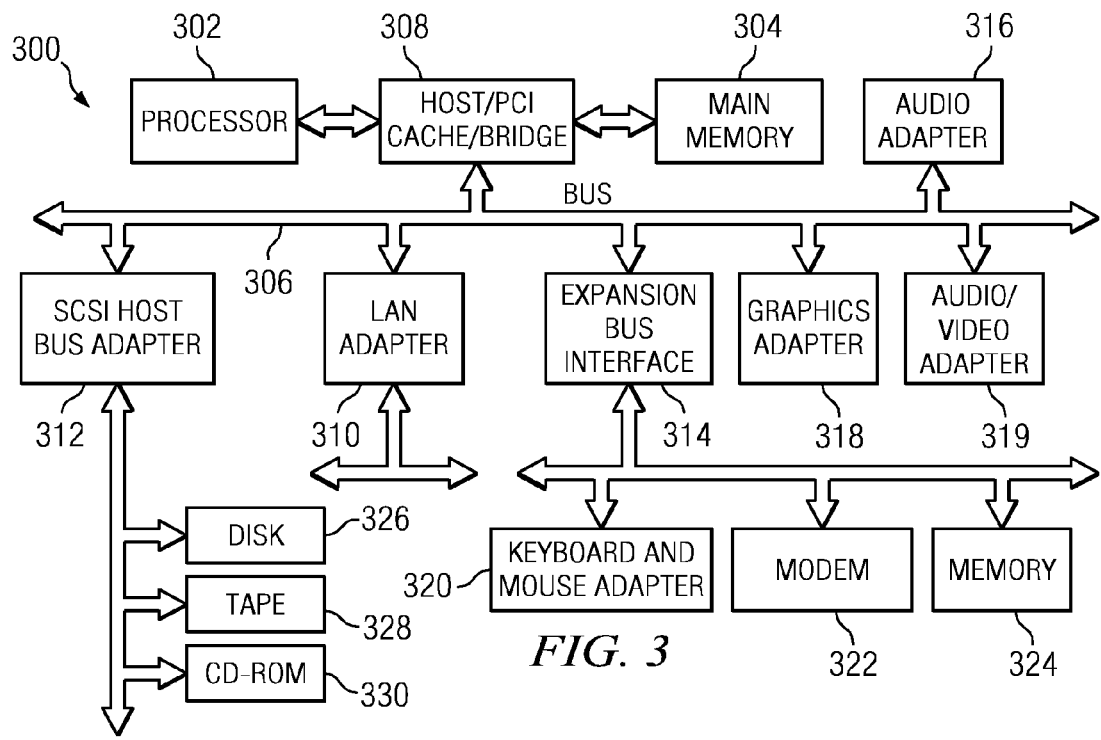
FIG. 3 is an exemplary block diagram of a client computing device in which aspects of the present invention may be implemented.

The present invention provides a system and method for categorizing content, e.g., electronic documents, invention disclosures, electronic forms, etc., by knowledge area and then routing the content to reviewers and/or review teams that have the optimal expertise for reviewing and approving/disapproving the content. Therefore, the present invention is especially well suited for implementation in a distributed data processing environment in which one or more networks are used as a communication medium between computing devices. Thus, the following FIGS. 1-3 are provided as an exemplary description of such an exemplary data processing environment and the server/client computing devices that may be used within such an exemplary embodiment. FIGS. 1-3 are only exemplary and are not intended to state or imply any limitation as to the data processing environment or computing devices that may be used with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

With the present invention, server 104 may be provided with mechanisms for performing invention disclosure categorization and routing in accordance with aspects of the present invention as discussed hereafter. Network storage unit 106 may be used to store information necessary to perform this invention disclosure categorization and routing. Client devices 108, 110 and 112 may be used to submit invention disclosures and/or receive invention disclosures for review by a user. Thus, client devices 108, 110 and 112 may be associated with inventors and/or reviewers or both. As discussed hereafter, these computing devices in the distributed data processing environment are used to submit invention disclosures, categorize the invention disclosures, select appropriate reviewers and/or review teams to review the invention disclosures based on established reviewer/review team expertise categories, and then route the invention disclosures to the selected reviewers/review team.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a system and method for routing content, such as electronic documents, invention disclosures, and the like, to persons, such as reviewers or review teams, based on an expertise matching mechanism that favors reviewers/review teams that are experienced in the general knowledge area, e.g., technology and/or business area, covered by the subject matter of the content. It should be appreciated that while the preferred embodiments of the present invention will be described in terms of reviewing invention disclosures, the present invention is not limited to such. Rather, any article or portion of content that must be reviewed and evaluated by individuals with specialized knowledge may be the subject of the present invention. That is, any article or portion of content that can be categorized into a particular area of special knowledge and which is to be reviewed and evaluated by individuals having this special knowledge, is intended to be within the spirit and scope of the present invention. For example, the content may include scientific/medical articles for a journal, insurance forms wherein a virtual team is to be selected to review the insurance forms, legislative content that is to be reviewed by legislative or judicial review panels, or any other type of content that is to be reviewed by one or more individuals having special knowledge pertaining to the content in order to approve/disapprove of the content for some purpose.

With a preferred embodiment of the system and method of the present invention in which the content is an invention disclosure that is to be reviewed by a reviewer/review team, an invention disclosure is categorized using an established categorization taxonomy when it is created. In addition, each review team and/or reviewer registers himself/herself with the system as having expertise in certain categories of technology/business from the categorization taxonomy. These categorizations are then used to match invention disclosures to reviewers and/or review teams so that the invention disclosures are reviewed by individuals that are most likely to understand the technology, its level of inventiveness with regard to the current state of the technological art, and the potential for business exploitation of the invention.

Figure 4:
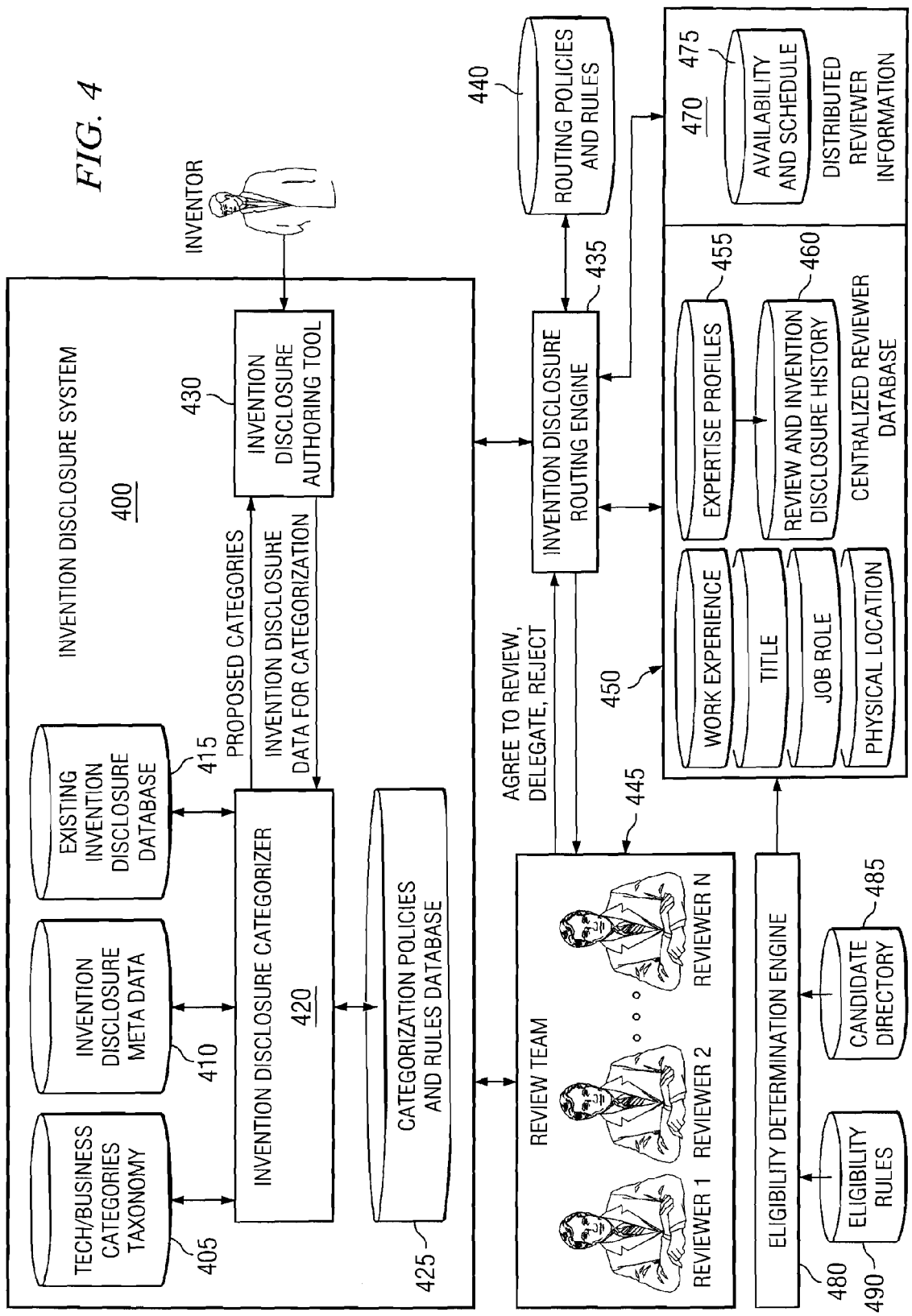
FIG. 4 is an exemplary diagram of the primary operational elements of an invention disclosure submission and routing system in accordance with one embodiment of the present invention.

FIG. 4 is an exemplary diagram of the primary operational elements of an invention disclosure submission and routing system in accordance with one embodiment of the present invention. It should be appreciated that the various data processing systems illustrated in FIG. 4 may be implemented in a distributed data processing environment, such as the distributed data processing environment illustrated in FIG. 1, on a plurality of computing devices. It should also be appreciated that many of the elements shown in FIG. 4 may be combined together in a single computing device. Thus, for example, the invention disclosure system and centralized reviewer database, as discussed hereafter, may be integrated into a single computing device or system or may be distributed across a plurality of computing devices and systems. FIG. 4 is only meant to be exemplary of one possible organization of the operational elements of the present invention and is not intended to state or imply any limitations as to the manner by which the present invention may be implemented.

As shown in FIG. 4, the invention disclosure submission and routing system of the exemplary embodiment includes an invention disclosure system 400 through which an inventor may submit an invention disclosure and have the invention disclosure categorized for routing to an appropriate reviewer, set of reviewers, or review team. The inventor interfaces with an invention disclosure authoring tool 430 which provides one or more graphical user interfaces through which the inventor may submit information about the inventor and the inventor's invention. The inventor information may include, for example, the inventor's name, organization, department, manager information, contact information, and the like. Such information may be gathered for each inventor on an invention disclosure. The invention information may include a conception date, workable date, description of the problem solved, description of the invention, information regarding publication or sale of the invention, information regarding joint ventures to develop the invention, information regarding any product in which the invention is a part, and the like. Invention disclosure authoring tools are generally known in the art. The result of such an invention disclosure authoring tool is an electronic document that represents the invention disclosure and contains the invention disclosure data necessary for evaluation of the invention for patenting purposes.

The invention disclosure is received in the invention disclosure system 400 and is analyzed by the invention disclosure categorizer 420. The invention disclosure categorizer 420 parses the invention disclosure and extracts metadata of the invention disclosure. This meta data is a simplified version of the invention disclosure in which elements of the invention disclosure that are pertinent to categorization are stored. That is, keywords from the invention description and/or problem description, titles, inventor organization parameter values, other parameter values, and the like, that may be used to determine appropriate categories for the invention disclosure, are extracted by the invention disclosure categorizer 420 and stored as part of a metadata file in the invention disclosure metadata database 410.

As previously mentioned above, the categorization of the invention disclosure may be performed manually by the creator of the invention disclosure, e.g., the inventor, or may be performed using an autocategorizing mechanism. With a manual process, the inventor may be presented with the technology/business categories taxonomy 405 via the invention disclosure authoring tool 430. The creator of the invention disclosure may then select from the taxonomy those categories of technology/business that most accurately reflect the technology/business areas covered by the invention disclosure. This information may then be stored as part of the invention disclosure metadata in the invention disclosure metadata database 410 for later use.

Alternatively, the invention disclosure may be provided to the invention disclosure categorizer 420 for automated or semi-automated classification of the invention disclosure. With an automated or semi-automated classification of the invention disclosure, the invention disclosure categorizer 420 obtains information from both the technology/business categories taxonomy database 405 and the existing invention disclosure database 415 to determine appropriate categories of technology/business in which to classify the invention disclosure. The invention disclosure metadata in the invention disclosure metadata database 410 is used to match the technology/business coverage of the invention disclosure against categories in the technology/business category taxonomy 405. For example, keywords or patterns of keywords extracted from the invention disclosure may be matched against keywords of categories in the technology/business categories taxonomy 405. The result is a list of potential categories for the invention disclosure.

This initial list of potential categories may be further refined using the information obtained from the existing invention disclosure database 415. The information obtained from the existing invention disclosure database 415 may include the invention disclosure itself, the invention disclosure metadata, the categories associated with the existing invention disclosures, the reviewers/review teams to which the invention disclosure was routed, and the like. The autocategorizing mechanism of the invention disclosure categorizer 420 may make use of, for example, keyword searches or other word and/or pattern matching mechanisms using the invention disclosure metadata for the invention disclosure stored in the invention disclosure metadata database 410 and match the metadata with existing invention disclosure information obtained from existing invention disclosure database 415.

Based on the categorization of existing invention disclosures and the degree of matching of the current invention disclosure metadata to the existing invention disclosures, the initial list of categories may be searched to identify those categories in the initial list of categories that match categories in which existing invention disclosures that are most like the current invention disclosure are categorized. That is, the most relevant categories from the initial list of categories are identified by determining the most closely related existing invention disclosures, identifying the categories associated with these most closely related existing invention disclosures, and matching these categories to categories in the initial list of categories. The matching categories in the initial list of categories are then returned as the suggested categories for the invention disclosure.

The categories of an invention disclosure, whether determined manually or automatically, may be ranked according to the most relevant category and less relevant categories. This ranking may be performed based on how many existing invention disclosures that most closely match the current invention disclosure are classified in the category, a degree to which the invention disclosure metadata of the current invention disclosure matches the category, and the like. Thus, a ranking of categories of technology/business from the technology/business category taxonomy 405 may be generated for the invention disclosure.

These categories may then be associated with the invention disclosure or may be provided to the creator of the invention disclosure via the invention disclosure authoring tool 430. If presented to the creator of the invention disclosure, the categories may be presented via a graphical user interface that permits the creator of the invention disclosure to select, from the ranked listing of most relevant categories, those categories that the creator wishes to classify the invention disclosure in. Thereafter, the selected categories may be associated with the invention disclosure and stored in the existing invention disclosure database 415. The category information and other necessary information for identifying the invention disclosure may then be provided to the invention disclosure routing engine 435.

The methodology employed by the invention disclosure categorizer 420 in extracting information from the invention disclosure to generate invention disclosure metadata, selecting categories from the technology/business categories taxonomy 405, and matching of the invention disclosure to existing invention disclosures, and ranking of the categories selected for an invention disclosure are all performed in accordance with the policies and rules stored in the categorization policies and rules database 425. This database 425 stores the necessary rules and policies that govern the operation of the invention disclosure categorizer 420 and are consulted by the invention disclosure categorizer 420 when making decisions on how to process the data from the various sources 405, 410 and 415.

The invention disclosure routing engine 435 receives invention disclosure information including the selected categories for the invention disclosure from the invention disclosure system 400. The invention disclosure routing engine 435, operating under the policies and rules stored in the routing policies and rules database 440, uses the categorization of the invention disclosure to select a review team/reviewers that are to receive the invention disclosure. The selection of a review team/reviewers involves retrieving information about the review team/reviewers from a centralized reviewer database 450. This reviewer database 450 may include information about review teams and/or individual reviewers for use in matching the review teams/reviewers with invention disclosures that have technology and business subject matter coverage that overlaps the review team/reviewers' areas of expertise. The reviewer database 450 stores information regarding the work experience, title, job role, physical location, organizational location, and the like, for each review team and/or reviewer. If the reviewer database 450 operates from a review team level, then the data stored for each review team may be an aggregate of information obtained about each individual reviewer associated with that review team.

In addition, the reviewer database 450 may store expertise profiles 455 for each review team/reviewer. These expertise profiles 455 may identify the categories of technology/business that the reviewer is considered to have sufficient knowledge in so that the reviewer is eligible to review invention disclosures in these categories of technology/business. For example, the reviewer, a manager of the reviewer, or some other individual within the business organization may evaluate the reviewer and select categories from the technology/business category taxonomy 405 that the reviewer is believed to be knowledgeable in. This list of categories may be maintained in a profile data structure within the reviewer database 450 in association with the reviewer and/or a review team that the reviewer is a member of.

Moreover, the centralized reviewer database 450 may include a review and invention disclosure history database 460 that stores information regarding the invention disclosures reviewed by, or submitted by, a reviewer. For example, an identification of invention disclosures reviewed by and submitted by the reviewer, along with the technology/business categories associated with these invention disclosures, may be maintained for each reviewer/review team. These categories may then be used to augment the expertise profiles 455 by adding categories to the expertise profiles 455 when a sufficient number of invention disclosures are reviewed and/or submitted by the reviewer. In this way, the reviewer's expertise profile may be dynamically updated as the reviewer submits new invention disclosures or reviews invention disclosures in various technology/business categories.

In addition, the expertise profiles 455 may store a level of expertise for each technology/business category associated with the reviewer. This level of expertise may further be updated dynamically as the reviewer submits invention disclosures and/or reviews invention disclosures in that particular category of technology/business. Thus, for example, if the reviewer submits 10 invention disclosures in a particular category of technology and reviews 20 invention disclosures in the same category of technology, the reviewer's expertise in that particular category of technology may be increased to a next level within the expertise profile for that reviewer.

The reviewer database 450 is preferably updated based on employee information maintained in a candidate directory 485. That is, reviewers are selected from the employee pool of the business organization when the employee achieves a position within the organization and a level of expertise in a particular technology/business area that makes it desirable to add that employee as a reviewer of invention disclosures. The requirements for selection of individuals from the candidate directory 485 for inclusion in the reviewer database 450 is implementation specific and is governed by the eligibility rules 490 established by the particular business organization. The eligibility determination engine 480 applies these eligibility rules to the entries in the candidate directory 485 periodically, or upon request, to select additional reviewers to be added to the reviewer database 450. Thus, the entries in the candidate directory 485 include similar information as that described for the reviewer database 450 with the reviewer database 450 being a specialized set of entries from the candidate directory 485, i.e. those entries in the candidate directory 485 that have been selected to be reviewers of invention disclosures.

The categories selected to be associated with the invention disclosure using the invention disclosure system 400 are used by the invention disclosure routing engine 435, under application of the policies and rules 440, to select a review team or predetermined number of reviewers from the centralized reviewer database 450 to review the invention disclosure to make decisions as to whether the invention described in the invention disclosure is of patentable significance and/or meets a business goal of the business organization. The invention disclosure routing engine 435 uses the categories and their rankings to select reviewers from the reviewer database 450 whose expertise profiles 455 indicate that they have expertise in the particular categories associated with the invention disclosure. The resulting list of reviewers may then be ranked based on their relative level of expertise and the ranking of the categories associated with the invention disclosure. Thus, reviewers that have expertise in the highest ranked category associated with the invention disclosure may appear first in the list in order of level of expertise, while reviewers with expertise in lower ranked categories may appear further down in the list of reviewers. Alternatively, a more complex method of ranking may involve looking at the various combinations of categories in which a reviewer has expertise and determining how many categories associated with the invention disclosure that the reviewer has expertise in along with the level of expertise and the ranking of the categories. Any ranking mechanism may be used that takes into account the expertise of the reviewers and the categories selected for association with the invention disclosure without departing from the spirit and scope of the present invention.

Once a ranked list of reviewers having expertise in the technology/business categories associated with the invention disclosure is generated, a predetermined number of the highest ranked reviewers are selected from the list. Availability and scheduling information 475 for the selected reviewers is then obtained from the distributed reviewer information 470. This information may be distributed across a plurality of computing systems and may be part of each reviewer's own client computing device, for example. The availability and scheduling information 475 may indicate the reviewers time schedule with regard to scheduled business meetings, vacations, other invention disclosure review meetings, business travel, and the like. Basically, the availability and scheduling information 475 provides information regarding when the reviewer will not be able to engage in the review of the invention disclosure and when they will be able to. This information may be used along with review dates set by the invention disclosure system 400 to determine if the selected reviewers will be able to perform the review of the invention disclosure given their current schedules of availability. Thus, for example, if an organization indicates that a review meeting for an invention disclosures is to be scheduled within a month of the submission of the invention disclosure, then the invention disclosure routing engine 435 may check the availability and scheduling information for the reviewers to make sure that they have sufficient available time within the next two months to review the invention disclosure and schedule the review meeting.

If a reviewer's availability and schedule indicate that they are not able to review the invention disclosure, then a next reviewer from the list of reviewers is selected and the process is repeated until a requisite number of reviewers is obtained. Of course, this process may be performed on a review team level such that it is determined whether the review team as a whole can review the invention disclosure and, if not, a next best review team is selected.

Those reviewers 445 that are selected and whose schedules indicate that they are able to perform the review of the invention disclosure are then sent notifications of their assignment to review the invention disclosure. These notifications may include links to the invention disclosure information stored in the existing invention disclosure database 415. In addition, the notification may include a graphical user interface through which the reviewer may accept, reject or delegate the review of the invention disclosure. If the reviewer accepts the invention disclosure, information about the reviewer and/or review team is stored in the existing invention disclosure database 415 in association with the invention disclosure.

If the reviewer rejects the review of the invention disclosure, the invention disclosure routing engine 435 selects an alternative reviewer from the list of reviewers to assign to review the invention disclosure. If the reviewer delegates the review of the invention disclosure, the identification of the person to which the review task is delegated is checked against the reviewer database 450 to determine if the person is an authorized reviewer of invention disclosures. If the person is not an authorized reviewer, then an alternative reviewer is selected from the list of reviewers. If the person is an authorized reviewer, then the above notification process is repeated with the person to which the review task is delegated.

It is possible in the selection of reviewers/review teams that more than one reviewer/review team may have the same level of expertise or may be equally preferred to be selected as a reviewer for the invention disclosure. In the event that more than one review team and/or reviewer has the same level of expertise necessary to perform a fair evaluation of the invention disclosure, the mechanism of the present invention favors the review team and/or reviewer based on a closeness of the review team or reviewer to the inventors identified in the invention disclosure in terms of organization and/or physical location.

Regardless of the particular routing of the invention disclosure to a review team/reviewer using the present invention, the inventors' organization is provided with credit for submission of the invention disclosure and the reviewing team/reviewer is provided with credit for performing the evaluation of the invention disclosure with regard to internal company accounting and incentive programs. Internal incentive programs for submission of invention disclosures and review of invention disclosures are generally known in the art and thus, a detailed explanation of them is not provided here.

Thus, as described above, the present invention provides a mechanism for categorization of invention disclosures and routing of invention disclosures to reviewers/review teams with the necessary expertise to fairly evaluate the invention disclosures for patentability and ability to further business objectives. In this way, the business organization's failure to act on invention disclosures that are not completely appreciated as far as patentability and/or business objectives are concerned, is minimized. Moreover, the business organization's expenditures on duplicative invention disclosures and invention disclosures that are not in line with the business objectives of the organization is also minimized.

In addition, since the present invention may be used to select review teams and/or individual reviewers, the present invention may be used to dynamically create review teams that have the requisite expertise for a particular invention disclosure, whether those reviewers are part of the same department in the organization, in the same location, or in distributed departments and locations. The present invention permits the formation and co-existence of two distinct types of review teams: (1) those that are broad in scope, where team members come from different disciplines; and (2) those that are focused in a specific area of business/technology. The present invention increases the visibility of ideas beyond the inventor's immediate physical location and/or organizational area as these novel concepts are exposed to expert individuals who know how best to leverage them in other areas of business. The present invention reduces the incidence of independently submitted disclosures that are alike but not yet in a searchable state as these would typically be routed to the same review team which is in a better position to recognize similarities. The present invention improves the overall quality of submissions through informed, insightful evaluations from review teams that have expertise in the particular technology areas. In addition, as discussed hereafter, the present invention may be used to view the expertise of review teams/reviews with regard to the taxonomy of invention categories so that it can be determined where coverage gaps or excesses are present. This may trigger the formation of a new review team or re-balancing of existing review teams.

FIG. 5 is an exemplary diagram of a technological/business category taxonomy that may be used to categorize invention disclosures and reviewer expertise in accordance with one exemplary embodiment of the present invention. As shown in FIG. 5, the taxonomy is a hierarchical category structure in which categories are set forth at a first level of the hierarchy and subcategories are provided at lower levels of the hierarchy. For example, the category "Software/Services/Applications/Solutions" may have subcategories of "Image Processing," "Human Language Processing," "Data Compression for Image & Sound," and the like. Furthermore, the subcategory "Image Processing" may have further subcategories, or sub-subcategories, of "Image manipulation; scaling; etc.," "Image rendering & visualization," "Image scanning," and "Image recognition."

Each category and subcategory has an associated identifier that may be used to identify the category/subcategory. In the depicted example, the identifier is the "Tech Tag" and is an alphanumeric identifier. In most instances the "Tech Tag" is a number such as "600" but in some instances related subcategories may be denoted by tech tags such as "810A." Other types of identifiers may be used without departing from the spirit and scope of the present invention. The identifiers are stored in relation to invention disclosures to thereby identify the categories associated with the invention disclosures. In addition, the same taxonomy and category identifiers may be used to represent a reviewer's expertise in a particular technology/business area. Thus, the category identifiers may be stored in a reviewer's expertise profile thereby identifying the reviewer as having knowledge in a particular category of technology/business. Alternatively, the reviewers may make use of a different taxonomy of technology/business categories as long as a mechanism is provided for mapping the taxonomy used to represent reviewer expertise with the taxonomy used to represent categories of technology/business for classifying invention disclosures.

As mentioned previously above, the present invention permits the inventor or creator of the invention disclosure to select categories from the depicted taxonomy to be associated with the inventor's/creator's invention disclosure for purposes of routing the invention to an appropriate review team. Thus, the inventor/creator may be provided with the taxonomy depicted and permitted to select from the hierarchical display of the taxonomy. Alternatively, selected categories may be presented to the inventor/creator based on an automated selection mechanism as described above, such that a list of possible categories from the depicted taxonomy are presented for the inventor/creator to choose from. Still further, the categorization based on the depicted taxonomy may be completely automated so that the classification of the invention disclosure is performed without the inventor/creator selecting any categories for the invention disclosure.

Similarly, a reviewer, manager, or other individual in the organization may use the depicted taxonomy to establish an expertise profile for a reviewer. Categories from the taxonomy may be selected and their identifiers stored in an expertise profile associated with a particular reviewer. In addition, the category identifiers associated with invention disclosures submitted and reviewed by the reviewer may be used to automatically update the reviewer's expertise profile by adding category identifiers to it, changing the level of expertise associated with a category identifier, or the like.

Figure 6:
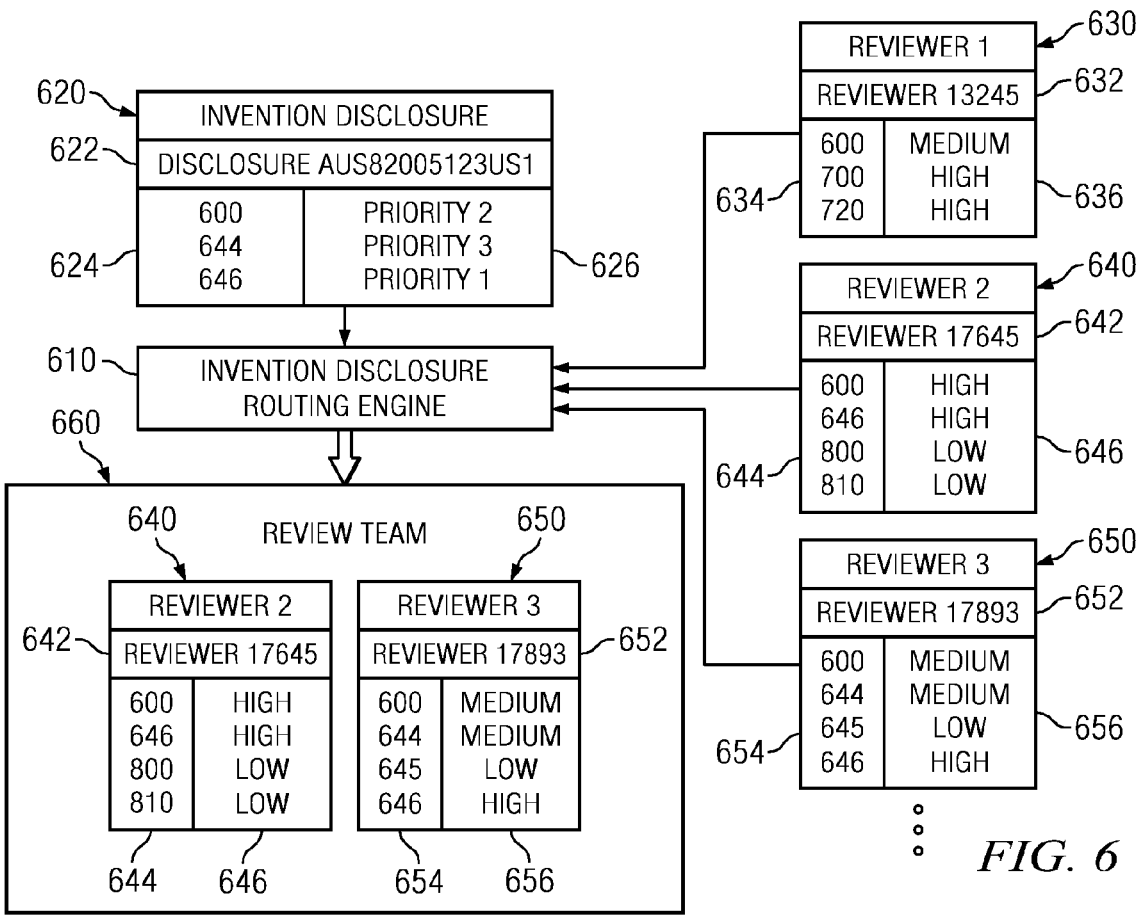
FIG. 6 is an exemplary diagram illustrating a manner by which an invention disclosure routing mechanism may be determine a review team or set of reviewers to which an invention disclosure should be routed in accordance with one exemplary embodiment of the present invention.

FIG. 6 is an exemplary diagram illustrating a manner by which an invention disclosure routing mechanism may be used to determine a review team or set of reviewers to which an invention disclosure should be routed in accordance with one exemplary embodiment of the present invention. As shown in FIG. 6, the invention disclosure routing engine 610 receives categorized invention disclosure information 620 from the invention disclosure system. This invention disclosure information 620 includes an invention disclosure identifier 622, a plurality of technology/business category identifiers 624, and priorities 626 associated with the category identifiers 624.

In addition, the invention disclosure routing engine 610 retrieves reviewer profiles 630, 640 and 650 from the reviewer database. Each profile includes a reviewer identifier 632, 642, 652, identifiers 634, 644, 654 of the technology/business categories in which the reviewer has expertise, and a level of expertise 636, 646, 656 for each technology/business category. It is assumed for purposes of this explanation that each of the reviewer's availability and scheduling information indicates that they are available to review the invention disclosure 620. It is further assumed that the required number of reviewers for the review team is two reviewers.

The invention disclosure routing engine 610 looks at the category identifiers 624 associated with the invention disclosure 620 and their corresponding priorities 626. The invention disclosure routing engine 610 then searches the reviewer database to retrieve reviewer profiles that include one or more of the category identifiers 624. The reviewer profiles 640-660 are then ranked according to which reviewer profiles 630, 640, 650 have expertise categories 634, 644, 654 include more of the category identifiers 624, which reviewer profiles 630, 640, 650 have higher priority category identifiers 624 in their expertise categories 634, 644, 654, and the level of expertise with regard to those category identifiers 624 appearing in the expertise categories 634, 644, 654.

In the depicted example, based on this selection process, reviewer 2 and reviewer 3 are selected to be part of the review team 660. Reviewer 3 has all three category identifiers 624 in its expertise categories 654 and reviewer 2 has two of the three category identifiers 624 in its expertise categories 644. Reviewer 2 and reviewer 3 have the same level of expertise with regard to the highest priority category, i.e. category "646." While reviewer 2 has a higher level of expertise in the second highest priority category, i.e. category "600," reviewer 3 has a good level of expertise in this category and furthermore, has expertise in the third highest priority category where reviewer 2 does not. Therefore, reviewer 3 is selected as a better choice than reviewer 2 to be included in the review team 660. However, since two reviewers are required for the review team 660, both reviewer 3 and reviewer 2 are selected for inclusion in the review team 660.

FIG. 7 is an exemplary diagram of a display for determining technology area expertise coverage by reviewers in accordance with on exemplary embodiment of the present invention. As mentioned above, in addition to maintaining reviewer profiles for each of the reviewers in the reviewer database, the reviewer expertise profiles may be used to determine an amount of reviewer coverage of particular technology/business categories in the technology/business category taxonomy. That is, the reviewer profiles may be used to determine an aggregate level of expertise of the reviewers in the various categories in the taxonomy so that a display indicating the level of expertise in each category with regard to review teams may be generated. FIG. 7 illustrates one possible representation of such a display.

As shown in FIG. 7, the display includes a display 710 of the categories in the taxonomy and a corresponding display 720 of the expertise coverage for the various categories. The display 720 of the expertise coverage includes identifiers as to the level of coverage, e.g., "high," "medium," "low," and "none." Various mechanism may be used to highlight these identifiers so as to bring the attention of the user to certain categories within the taxonomy. For example, various colors, shadings, highlighting, and the like may be used to accentuate those categories that have a "low" or "none" level of expertise coverage while lesser levels of accentuation may be provided to categories that have "medium" and "high" levels of expertise coverage. In this way, the areas where additional coverage is necessary may be highlighted so that new review teams may be established to cover those technology/business areas.

FIG. 8 is an exemplary diagram of the primary operational elements of an invention disclosure and routing mechanism in accordance with an alternative embodiment of the present invention in which measurement mechanisms are provided for measuring the effectiveness of the invention disclosure categorization mechanism and the invention disclosure routing mechanism. The primary difference between this embodiment and the previous embodiments described in regard to FIG. 4 is that monitoring mechanisms are provided for gauging the effectiveness of the categorization and routing processes of the present invention.

As shown in FIG. 8, in addition to those elements described with regard to FIG. 4, the invention disclosure system 400 includes a categorization monitoring system 810 that monitors the selection of categories for invention disclosures made by invention disclosure categorizer in relation to the final selections made by the inventor/creator. That is, the monitoring system 810 determines when the invention disclosure categorizer selects a category as a preferred category for the invention disclosure and the inventor/creator of the invention disclosure either selects that category or selects a different category that is not as preferred. This information may be used to determine the effectiveness of the invention disclosure categorizer so that reports of this effectiveness may be generated for use by a system administrator. Such reports may indicate areas where the categorization policies and rules need to be modified to achieve higher levels of effectiveness.

Similarly, this alternative embodiment includes a reviewer participation monitoring system 820 that monitors the routing performed by the invention disclosure routing engine. The reviewer participation monitoring system 820 monitors how often a reviewer is selected to review an invention disclosure and either accepts, rejects, or delegates the review task to another reviewer. This information may be used to generate reports as to whether a particular reviewer should be more or less favored than other reviewers in determining the routing of invention disclosures. For example, if a reviewer is often selected to review invention disclosures but rejects or delegates this review task, then the reviewer may be less favored over other reviewers when determining where to route invention disclosures, even though the reviewer may be more highly ranked with regard to his/her expertise. Thus, the information collected by the reviewer participation monitoring system 820 may be used to adjust the ranking of reviewers based on their willingness to participate in the invention disclosure review process.

Therefore, in addition to the functionality described above with regard to FIG. 4, the alternative embodiment illustrated in FIG. 8 provides mechanisms for monitoring the effectiveness of the invention disclosure and routing system with regard to its categorization and routing functions. The information collected by this monitoring of effectiveness may be used to modify the categorization and routing operations performed so that a more effective system is developed.

Figure 9:
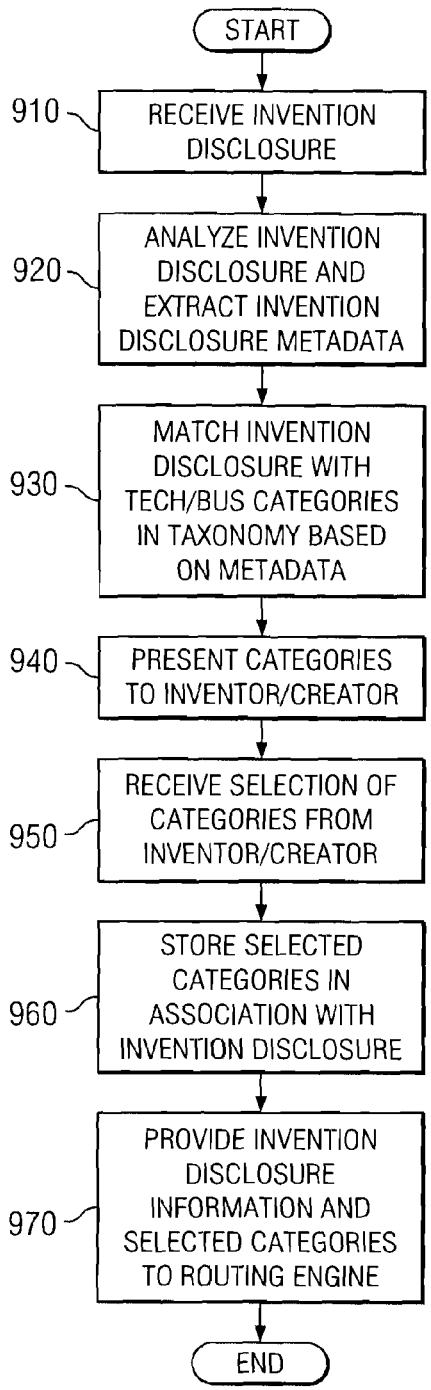
FIG. 9 is an exemplary flowchart outlining an exemplary operation of the present invention when generating an invention disclosure in accordance with one exemplary embodiment of the present invention.
Figure 10:
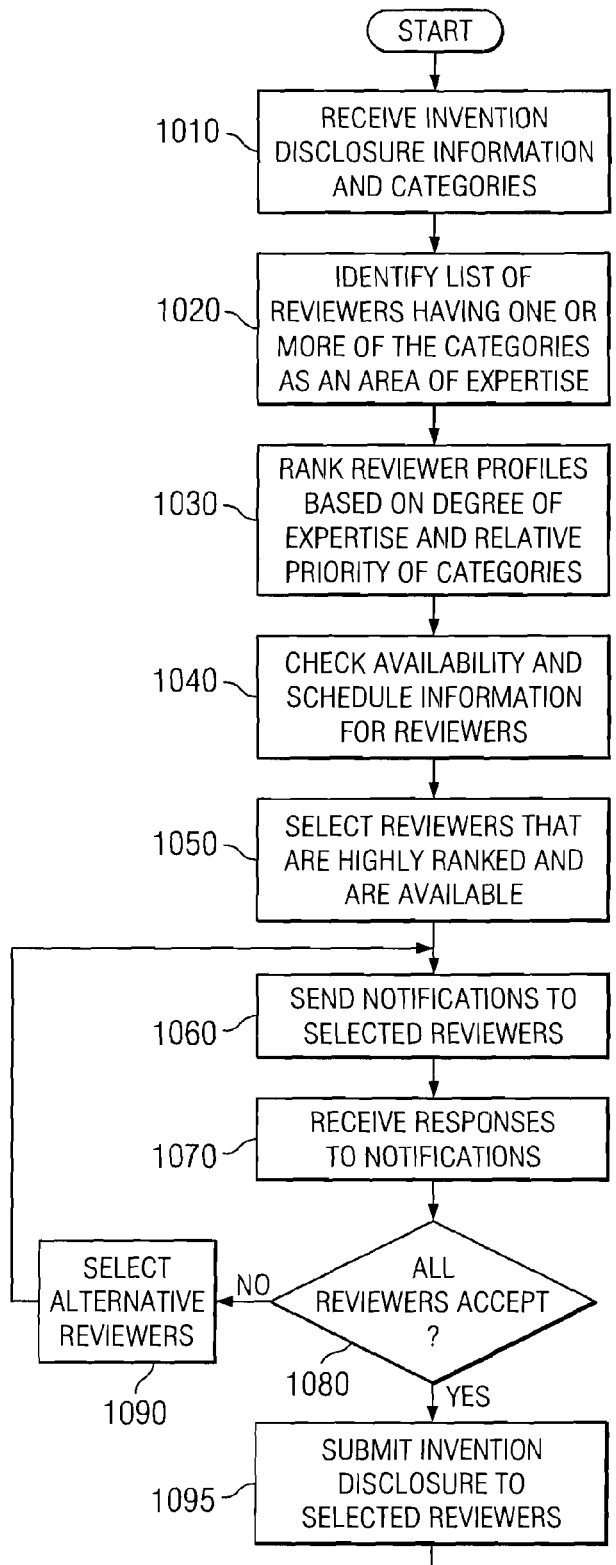
FIG. 10 is an exemplary flowchart outlining an exemplary operation of the present invention when routing a categorized invention disclosure to a set of reviewers or review team.

FIGS. 9 and 10 are flowcharts that illustrate exemplary operations of one exemplary embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 9 is an exemplary flowchart outlining an exemplary operation of the present invention when generating an invention disclosure in accordance with one exemplary embodiment of the present invention. As shown in FIG. 9, the operation starts by receiving an invention disclosure from an inventor/creator client computing device (step 910). The invention disclosure is then analyzed to extract invention disclosure metadata (step 920). The invention disclosure metadata is then used to match the invention disclosure with one or more technology/business categories in a technology/business category taxonomy (step 930). As described previously, this may be done manually by the inventor/creator, semi-automatically or fully automatically using the invention disclosure metadata and category information maintained for existing invention disclosures.

Thereafter, the categories may be presented to the inventor/creator for confirmation, selection of certain categories to be associated with the invention disclosure, or the like (step 940). The inventor/creator's selection of categories from those presented may then be received (step 950). In a fully automated embodiment, this step and the previous step may be eliminated since it is not necessary to get the inventor/creator's selection of categories. The selection of categories may include all of those presented or specific ones of those presented to the inventor/creator in step 940. The previous step 940 may involve merely displaying the taxonomy of categories if the system is completely manual with regard to category selection.

The selected categories are then stored in association with the invention disclosure in an existing invention disclosure database (step 960). Invention disclosure information along with the selected categories for the invention disclosure may then be sent to the invention disclosure routing engine for use in determining which reviewers should be assigned to review the invention disclosure (step 970). The operation then ends.

FIG. 10 is an exemplary flowchart outlining an exemplary operation of the present invention when routing a categorized invention disclosure to a set of reviewers or review team. As shown in FIG. 10, the operation starts by receiving invention disclosure and category information from an invention disclosure system (step 1010). A list of reviewers/review teams having expertise in the categories associated with the invention disclosure are then identified from the reviewer database (step 1020). The reviewer profiles for these reviewers are then ranked based on their degree of expertise in the various categories and the relative priority associated with each category in the categorization of the invention disclosure (step 1030).

Thereafter, the availability and schedule information for a predetermined set of the reviewers in the ranked list of reviewers is evaluated to determine if they are able to review the invention disclosure (step 1040). A set of reviewers that are highly ranked in the list of reviewers and that are available to review the invention disclosure are then selected (step 1050) and notifications are sent to the selected reviewers' client computing devices (step 1060).

Responses to the notifications are then received from the reviewers' client computing devices (step 1070). A determination is made as to whether all of the selected reviewers accepted the review task (step 1080). If not, for those reviewers that did not accept the review task, alternative reviewers are selected (step 1090). If the rejection of the review task involved the delegation of the review task to another specified reviewer, the selection of an alternative reviewer may involve determining if the specified delegate is an authorized reviewer and is available to review the invention disclosure. The operation returns to step 1060 where a notification is sent out to the selected alternative reviewers and the process is repeated until all of the selected reviewers accept the review task.

Once all of the reviewers accept the review task, the invention disclosures are submitted to the reviewers for their review (step 1095). This may involve sending notifications to the reviewers' client computing devices with links to the invention disclosure entry in the existing invention disclosure database, for example. Thereafter, the operation ends.

Thus, the present invention provides a mechanism for the categorization of invention disclosures into technology/business categories in a taxonomy of categories such that the invention disclosures may be routed to reviewers/review teams having the necessary expertise to fairly evaluate the invention disclosure. In addition, the present invention provides a mechanism for specifying the expertise of the various reviewers/review teams so that they may be matched with invention disclosures that are in line with their expertise. As a result, a more efficient and accurate evaluation of invention disclosures is obtained when compared to the known organizational and physical location based methodologies in use today.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for routing content to a person for review and evaluation of the content, comprising:

receiving the content;

a step of determining one or more subject matter categories to be associated with the content based on subject matter within the content, wherein the step of determining one or more subject matter categories to be associated with the content based on subject matter within the content includes:

analyzing the content to generate identifiers of subject matter of the content; and determining a number of previously analyzed content that match the identifiers of subject matter of the content; and selecting one or more subject matter categories from a taxonomy of subject matter categories based on subject matter categories associated with the different previously analyzed content if the number of previously analyzed content that match the identifiers of subject matter of the content is above a threshold number;

retrieving profiles for one or more people that are authorized to review and evaluate content, wherein the profiles include identifiers of categories of knowledge of the one or more people, wherein the categories of knowledge are also subject matter categories within the taxonomy of subject matter categories and indicate areas of knowledge held by an associated person;

a step of selecting a person, from the one or more people, to review and evaluate the content based on the one or more subject matter categories and categories of knowledge of the one or more people; and routing the content to a client computing device associated with the selected person;

monitoring an effectiveness of the step of determining one or more subject matter categories to be associated with the content based on subject matter within the content;

generating a first report of the effectiveness of the step of determining one or more subject matter categories to be associated with the content based on subject matter within the content; and monitoring an effectiveness of the step of selecting a person, from the one or more people, to review and evaluate the content based on the one or more subject matter categories and categories of knowledge of the one or more people.

2. The method of claim 1, wherein the content is an electronic invention disclosure document identifying one or more invention ideas of one or more inventors.

3. The method of claim 1, further comprising:

repeating the selecting a person and routing steps for each of a plurality of people, wherein the plurality of people define a review team for reviewing and evaluating the content.

4. The method of claim 3, wherein the selecting a person and routing steps are repeated until a designated minimum number of review team people are selected from the one or more people.

5. The method of claim 1, wherein the identifiers of subject matter of the content are patterns of keywords extracted from the content.

6. The method of claim 1, further comprising:

ranking the one or more subject matter categories in accordance with a relevance of the subject matter categories to subject matter in the content.

7. The method of claim 1, wherein the step of selecting a person, from the one or more people, to review and evaluate the content based on the one or more subject matter categories and categories of knowledge of the one or more people further includes:

selecting a person from the one or more people based on one or more of physical proximity of the one or more people to a creator of the content and a degree of correspondence between an organization affiliation of the one or more people and an organization affiliation of the creator of the content.

8. The method of claim 1, wherein the one or more subject matter categories represent technology areas.

9. The method of claim 1, further comprising:

generating a metadata file storing the identifiers of subject matter of the content, wherein determining a number of previously analyzed content that match the identifiers of subject matter of the content and selecting one or more subject matter categories from a taxonomy of subject matter categories based on subject matter categories associated with the different previously analyzed content are performed based on the metadata file.

10. The method of claim 1, wherein each profile in the profiles for one or more people further includes an identifier of a level of expertise for each identified category of knowledge in the profile, and wherein the step of selecting a person from the one or more people is further based on the identifiers of a level of expertise for each identified category of knowledge in the profiles.

11. The method of claim 10, wherein the identifier of a level of expertise for each identified category of knowledge in the profile is dynamically updated as an associated person reviews and evaluates content or submits content for review and evaluation.

12. The method of claim 1, wherein the step of selecting a person, from the one or more people, to review and evaluate the content based on the one or more subject matter categories and categories of knowledge of the one or more people includes:

selecting a plurality of people from the one or more people based on a correspondence between the one or more subject matter categories and categories of knowledge of the one or more people;

ranking each person in the selected plurality of people relative to the other people in the selected plurality of people based on a correspondence between the categories of knowledge in the person's profile and the one or more subject matter categories, to thereby generate a ranked list of potential reviewers of the content; and selecting a person from the ranked list of potential reviewers of the content.

13. The method of claim 12, wherein selecting a person from the ranked list of potential reviewers of the content includes:

retrieving schedule information for one or more of the potential reviewers in the ranked list of reviewers;

determining if the schedule information for the one or more potential reviewers indicates that the one or more reviewers will be available to review the content; and selecting a person from the one or more potential reviewers if the schedule information indicates that the person will be available to review the content.

14. A system for routing content to a person for review and evaluation of the content, comprising:

means for receiving the content;

means for determining one or more subject matter categories to be associated with the content based on subject matter within the content, wherein the means for determining one or more subject matter categories to be associated with the content based on subject matter within the content includes:

means for analyzing the content to generate identifiers of subject matter of the content; and means for determining a number of previously analyzed content that match the identifiers of subject matter of the content; and means for selecting one or more subject matter categories from a taxonomy of subject matter categories based on subject matter categories associated with the different previously analyzed content if the number of previously analyzed content that match the identifiers of subject matter of the content is above a threshold number;

means for retrieving profiles for one or more people that are authorized to review and evaluate content, wherein the profiles include identifiers of categories of knowledge of the one or more people, wherein the categories of knowledge are also subject matter categories within the taxonomy of subject matter categories and indicate areas of knowledge held by an associated person;

means for selecting a person, from the one or more people, to review and evaluate the content based on the one or more subject matter categories and categories of knowledge of the one or more people;

means for routing the content to a client computing device associated with the selected person;

means for monitoring an effectiveness of determining one or more subject matter categories to be associated with the content based on subject matter within the content;

means for generating a first report of the effectiveness of determining one or more subject matter categories to be associated with the content based on subject matter within the content; and means for monitoring an effectiveness of selecting a person, from the one or more people, to review and evaluate the content based on the one or more subject matter categories and categories of knowledge of the one or more people.

15. The system of claim 14, wherein the content is an electronic invention disclosure document identifying one or more invention ideas of one or more inventors.

16. The system of claim 14, further comprising:

means for repeating the selecting and routing for each of a plurality of people, wherein the plurality of people define a review team for reviewing and evaluating the content.

17. The system of claim 16, wherein the means for repeating the selecting and routing repeats the selecting and routing until a designated minimum number of review team people are selected from the one or more people.

18. The system of claim 14, wherein the identifiers of subject matter of the content are patterns of keywords extracted from the content.

19. The system of claim 14, further comprising:

means for ranking the one or more subject matter categories in accordance with a relevance of the subject matter categories to subject matter in the content.

20. The system of claim 14, wherein the means for selecting a person, from the one or more people, to review and evaluate the content based on the one or more subject matter categories and categories of knowledge of the one or more people further includes:

means for selecting a person from the one or more people based on one or more of physical proximity of the one or more people to a creator of the content and a degree of correspondence between an organization affiliation of the one or more people and an organization affiliation of the creator of the content.

21. The system of claim 14, wherein the one or more subject matter categories represent technology areas.

22. The system of claim 14, further comprising:

means for generating a metadata file storing the identifiers of subject matter of the content, wherein the means for determining a number of previously analyzed content that match the identifiers of subject matter of the content and the means for selecting one or more subject matter categories from a taxonomy of subject matter categories based on subject matter categories associated with the different previously analyzed content are performed based on the metadata file.

23. The system of claim 14, wherein each profile in the profiles for one or more people further includes an identifier of a level of expertise for each identified category of knowledge in the profile, and wherein selecting a person from the one or more people is further based on the identifiers of a level of expertise for each identified category of knowledge in the profiles.

24. The system of claim 23, wherein the identifier of a level of expertise for each identified category of knowledge in the profile is dynamically updated as an associated person reviews and evaluates content or submits content for review and evaluation.

25. The system of claim 14, wherein the means for selecting a person, from the one or more people, to review and evaluate the content based on the one or more subject matter categories and categories of knowledge of the one or more people includes:

means for selecting a plurality of people from the one or more people based on a correspondence between the one or more subject matter categories and categories of knowledge of the one or more people;

means for ranking each person in the selected plurality of people relative to the other people in the selected plurality of people based on a correspondence between the categories of knowledge in the person's profile and the one or more subject matter categories, to thereby generate a ranked list of potential reviewers of the content; and means for selecting a person from the ranked list of potential reviewers of the content.

26. The system of claim 25, wherein the means for selecting a person from the ranked list of potential reviewers of the content includes:

means for retrieving schedule information for one or more of the potential reviewers in the ranked list of reviewers;

means for determining if the schedule information for the one or more potential reviewers indicates that the one or more reviewers will be available to review the content; and means for selecting a person from the one or more potential reviewers if the schedule information indicates that the person will be available to review the content.

27. A computer program product in a computer readable medium for routing content to a person for review and evaluation of the content, comprising:
  first instructions for receiving the content;
  second instructions for determining one or more subject matter categories to be associated with the content based on subject matter within the content, wherein the second instructions for determining one or more subject matter categories to be associated with the content based on subject matter within the content include:
    instructions for analyzing the content to generate identifiers of subject matter of the content;
    instructions for determining a number of previously analyzed content that match the identifiers of subject matter of the content;
    instructions for selecting one or more subject matter categories from a taxonomy of subject matter categories based on subject matter categories associated with the different previously analyzed content if the number of previously analyzed content that match the identifiers of subject matter of the content is above a threshold number;
  third instructions for retrieving profiles for one or more people that are authorized to review and evaluate content, wherein the profiles include identifiers of categories of knowledge of the one or more people, wherein the categories of knowledge are also subject matter categories within the taxonomy of subject matter categories and indicate areas of knowledge held by an associated person;
  fourth instructions for selecting a person, from the one or more people, to review and evaluate the content based on the one or more subject matter categories and categories of knowledge of the one or more people;
  fifth instructions for routing the content to a client computing device associated with the selected person;
  sixth instructions for monitoring an effectiveness of determining one or more subject matter categories to be associated with the content based on subject matter within the content;
  seventh instructions for generating a first report of the effectiveness of determining one or more subject matter categories to be associated with the content based on subject matter within the content; and
  eighth instructions for monitoring an effectiveness of selecting a person, from the one or more people, to review and evaluate the content based on the one or more subject matter categories and categories of knowledge of the one or more people.

28. The computer program product of claim 27, wherein the content is an electronic invention disclosure document identifying one or more invention ideas of one or more inventors.

29. The computer program product of claim 27, further comprising:
  ninth instructions for repeating the selecting and routing for each of a plurality of people, wherein the plurality of people define a review team for reviewing and evaluating the content.

30. The computer program product of claim 29, wherein the ninth instructions for repeating the selecting and routing repeats the selecting and routing until a designated minimum number of review team people are selected from the one or more people.

31. The computer program product of claim 27, wherein the identifiers of subject matter of the content are patterns of keywords extracted from the content.

32. The computer program product of claim 27, further comprising:
  tenth instructions for ranking the one or more subject matter categories in accordance with a relevance of the subject matter categories to subject matter in the content.

33. The computer program product of claim 27, wherein the fourth instructions for selecting a person, from the one or more people, to review and evaluate the content based on the one or more subject matter categories and categories of knowledge of the one or more people further include:
  instructions for selecting a person from the one or more people based on one or more of physical proximity of the one or more people to a creator of the content and a degree of correspondence between an organization affiliation of the one or more people and an organization affiliation of the creator of the content.

34. The computer program product of claim 27, wherein the one or more subject matter categories represent technology areas.

35. The computer program product of claim 27, further comprising:
  instructions for generating a metadata file storing the identifiers of subject matter of the content, wherein the instructions for determining a number of previously analyzed content that match the identifiers of subject matter of the content and the instructions for selecting one or more subject matter categories from a taxonomy of subject matter categories based on subject matter categories associated with the different previously analyzed content are performed based on the metadata file.

36. The computer program product of claim 27, wherein each profile in the profiles for one or more people further includes an identifier of a level of expertise for each identified category of knowledge in the profile, and wherein the instructions selecting a person from the one or more people is further based on the identifiers of a level of expertise for each identified category of knowledge in the profiles.

37. The computer program product of claim 36, wherein the identifier of a level of expertise for each identified category of knowledge in the profile is dynamically updated as an associated person reviews and evaluates content or submits content for review and evaluation.

38. The computer program product of claim 27, wherein the fourth instructions for selecting a person, from the one or more people, to review and evaluate the content based on the one or more subject matter categories and categories of knowledge of the one or more people include:
  instructions for selecting a plurality of people from the one or more people based on a correspondence between the one or more subject matter categories and categories of knowledge of the one or more people;
  instructions for ranking each person in the selected plurality of people relative to the other people in the selected plurality of people based on a correspondence between the categories of knowledge in the person's profile and the one or more subject matter categories, to thereby generate a ranked list of potential reviewers of the content; and
  instructions for selecting a person from the ranked list of potential reviewers of the content.

39. The computer program product of claim 38, wherein the instructions for selecting a person from the ranked list of potential reviewers of the content include:

instructions for retrieving schedule information for one or more of the potential reviewers in the ranked list of reviewers;

instructions for determining if the schedule information for the one or more potential reviewers indicates that the one or more reviewers will be available to review the content; and instructions for selecting a person from the one or more potential reviewers if the schedule information indicates that the person will be available to review the content.

40. A method, in a data processing system, for routing content to a person for review and evaluation of the content, comprising:

receiving the content;

determining one or more subject matter categories to be associated with the content based on subject matter within the content, wherein determining one or more subject matter categories to be associated with the content based on subject matter within the content includes:

analyzing the content to generate identifiers of subject matter of the content; and selecting one or more subject matter categories from a taxonomy of subject matter categories, wherein selecting one or more subject matter categories from a taxonomy of subject matter categories includes:

comparing the identifiers of subject matter of the content to different previously analyzed content;

determining a degree of matching of the identifiers of subject matter of the content to the different previously analyzed content, wherein determining a degree of matching of the identifiers of subject matter of the content to different previously analyzed content comprises determining a number of previously analyzed content that match the identifiers of the subject matter of the content; and selecting one or more subject matter categories from the taxonomy based on subject matter categories associated with the different previously analyzed content if the determined number of previously analyzed content that match the identifiers of subject matter of the content is above a threshold number;

retrieving profiles for one or more people that are authorized to review and evaluate content, wherein the profiles include identifiers of categories of knowledge of the one or more people, wherein the categories of knowledge are also subject matter categories within the taxonomy of subject matter categories and indicate areas of knowledge held by an associated person;

selecting a person, from the one or more people, to review and evaluate the content based on the one or more subject matter categories and categories of knowledge of the one or more people, wherein selecting a person, from the one or more people, to review and evaluate the content based on the one or more subject matter categories and categories of knowledge of the one or more people includes:

selecting a plurality of people from the one or more people based on a correspondence between the one or more subject matter categories and categories of knowledge of the one or more people;

ranking each person in the selected plurality of people relative to other people in the selected plurality of people based on a correspondence between the categories of knowledge in the person's profile and the one or more subject matter categories, to thereby generate a ranked list of potential reviewers of the content; and selecting a person from the ranked list of potential reviewers of the content; and routing the content to a client computing device associated with the selected person;

monitoring an effectiveness of determining one or more subject matter categories to be associated with the content based on subject matter within the content;

generating a first report of the effectiveness of determining one or more subject matter categories to be associated with the content based on subject matter within the content; and monitoring an effectiveness of selecting a person, from the one or more people, to review and evaluate the content based on the one or more subject matter categories and categories of knowledge of the one or more people.

41. The method of claim 40, wherein the identifiers of categories of knowledge included in the profiles comprise identifiers of a level of expertise for each category of knowledge included in the profiles.

* * * * *